United States Patent [19]

Araujo et al.

[11] 4,125,404

[45] Nov. 14, 1978

[54] PHOTOCHROMIC GLASSES EXHIBITING DICHROISM, BIREFRINGENCE AND COLOR ADAPTATION

[75] Inventors: Roger J. Araujo, Corning; Nicholas F. Borrelli, Elmira; Jan B. Chodak, Painted Post; George B. Hares, Corning; Gerald S. Meiling, Painted Post; Thomas P. Seward, III, Corning, all of N.Y.

[73] Assignee: Corning Glass Works, Corning, N.Y.

[21] Appl. No.: 739,122

[22] Filed: Nov. 5, 1976

[51] Int. Cl.$^2$ .................. C03C 3/26; C03C 3/08; C03C 3/30
[52] U.S. Cl. .................. 106/54; 106/47 R; 106/47 Q; 106/52; 106/DIG. 6; 106/53; 65/30 R
[58] Field of Search .................. 106/DIG. 6, 54, 53, 106/52; 65/30

[56] References Cited

U.S. PATENT DOCUMENTS

| | | | |
|---|---|---|---|
| 3,208,860 | 9/1965 | Armistead et al. | 106/DIG. 6 |
| 3,540,793 | 11/1970 | Araujo et al. | 106/DIG. 6 |
| 3,734,754 | 5/1973 | Randall et al. | 106/DIG. 6 |
| 3,920,463 | 11/1975 | Simms | 106/DIG. 6 |
| 4,017,318 | 4/1977 | Pierson et al. | 106/DIG. 6 |
| 4,075,024 | 2/1978 | Armistead | 106/54 |

*Primary Examiner*—O. R. Vertiz
*Assistant Examiner*—Mark Bell
*Attorney, Agent, or Firm*—Kees van der Sterre; Clinton S. Janes, Jr.; Clarence R. Patty, Jr.

[57] ABSTRACT

Silver halide-containing photochromic glasses are rendered optically anisotropic by darkening with actinic radiation and irradiating with linearly polarized bleaching light. A photochromic glass so treated will be optically isotropic when it returns to the clear state, but may again become optically anisotropic when redarkened. Color adaptation results when darkened silver halide-containing photochromic glasses are irradiated with colored optical bleaching light.

15 Claims, 15 Drawing Figures

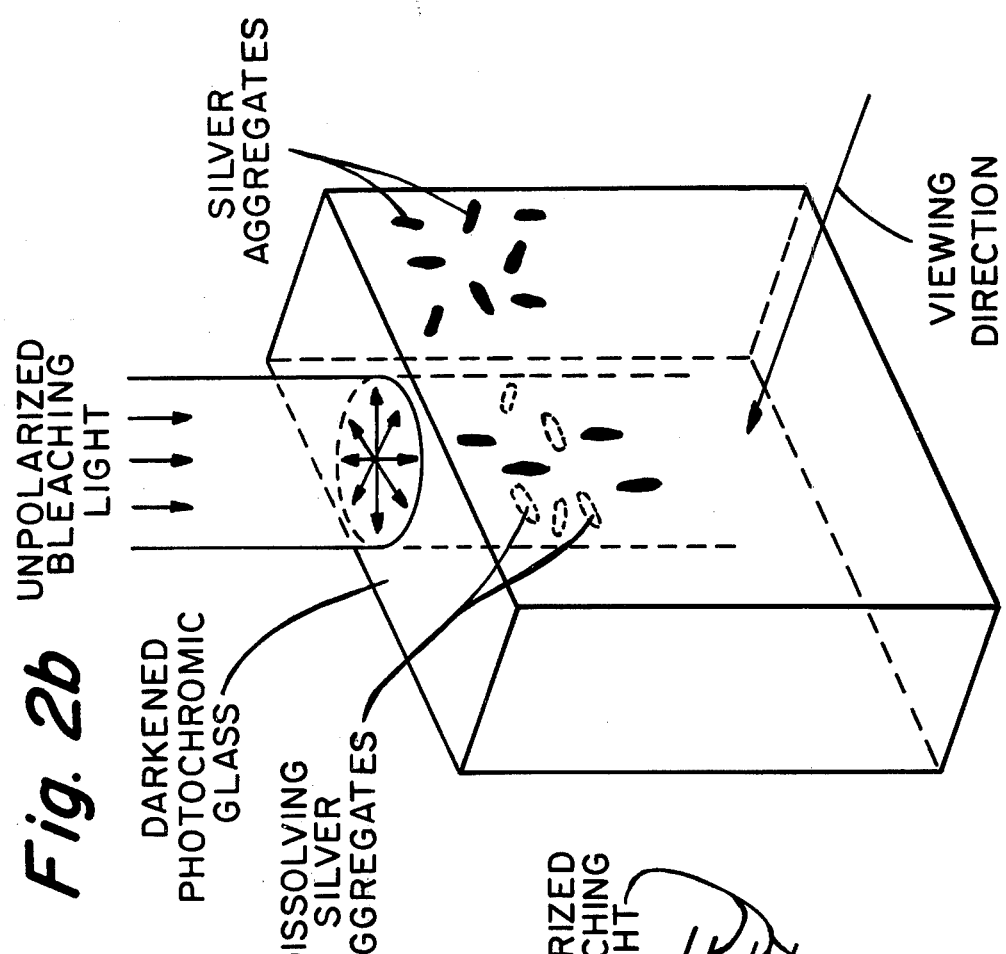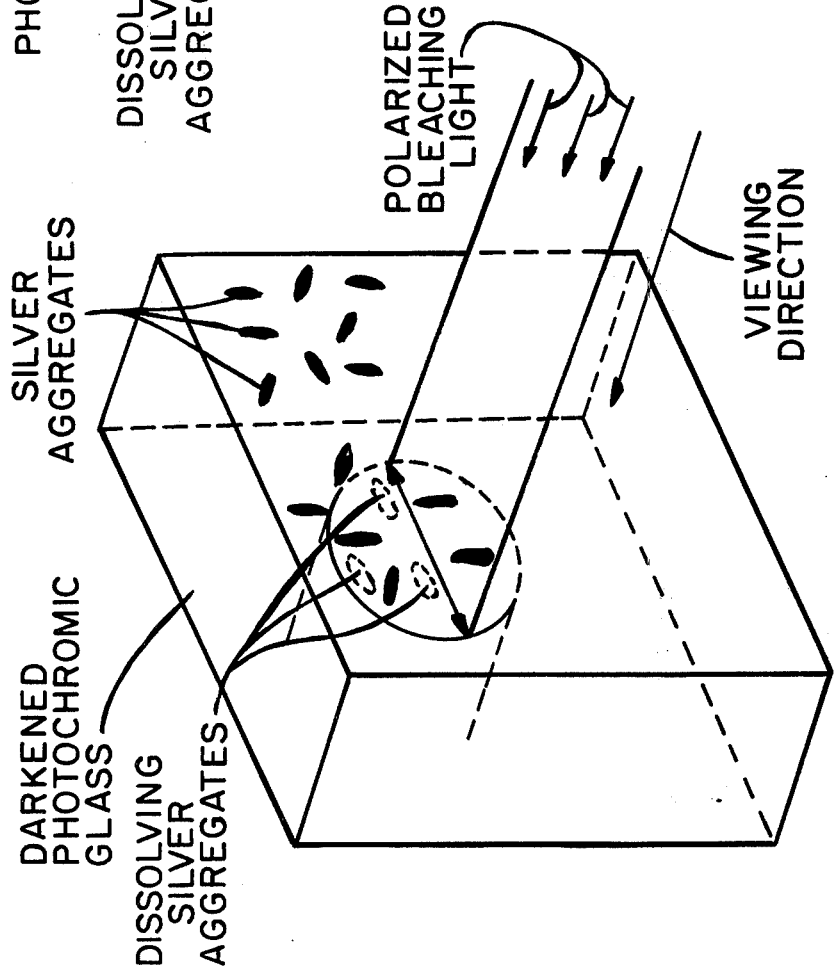
Fig. 2a
Fig. 2b

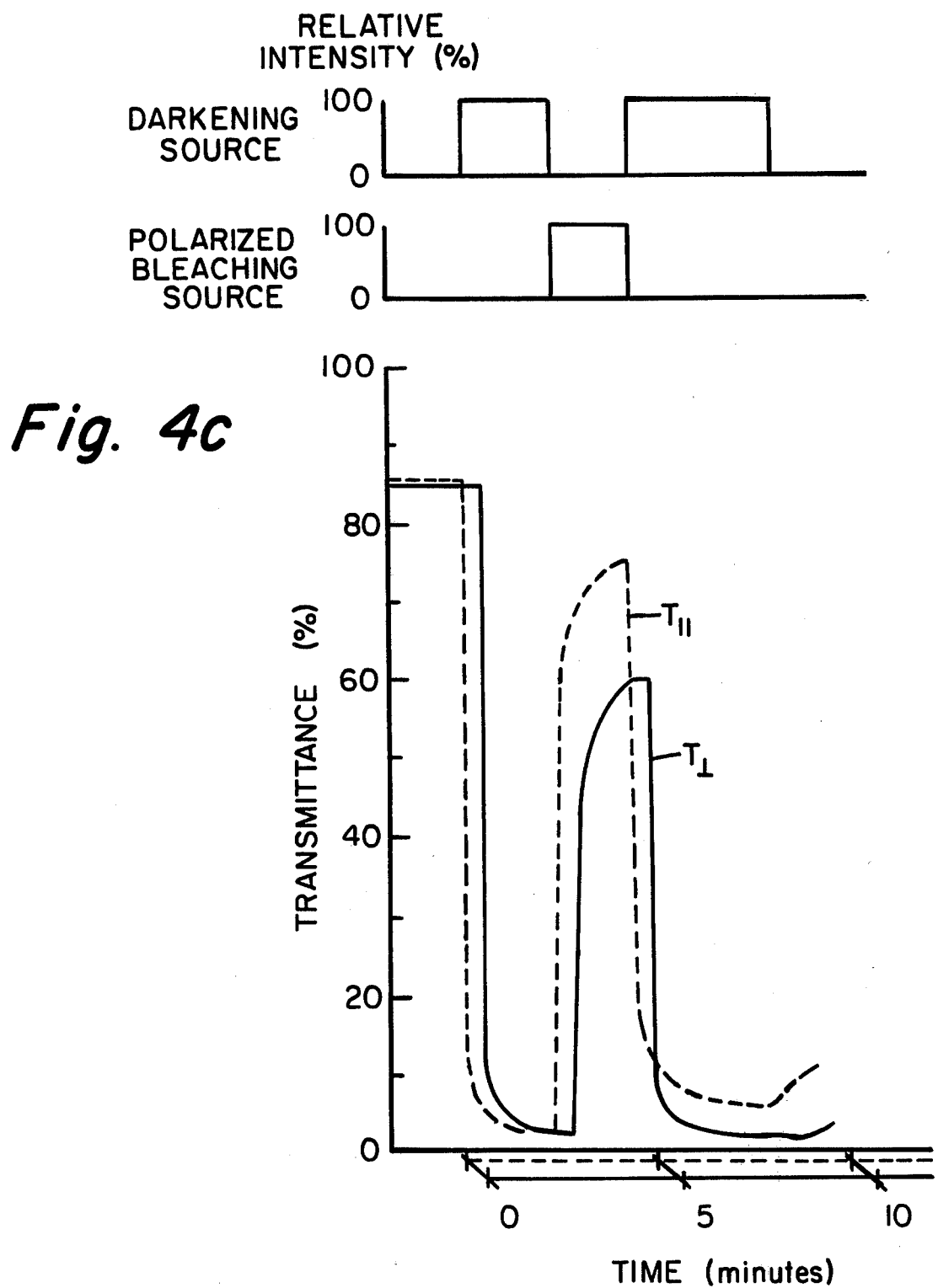

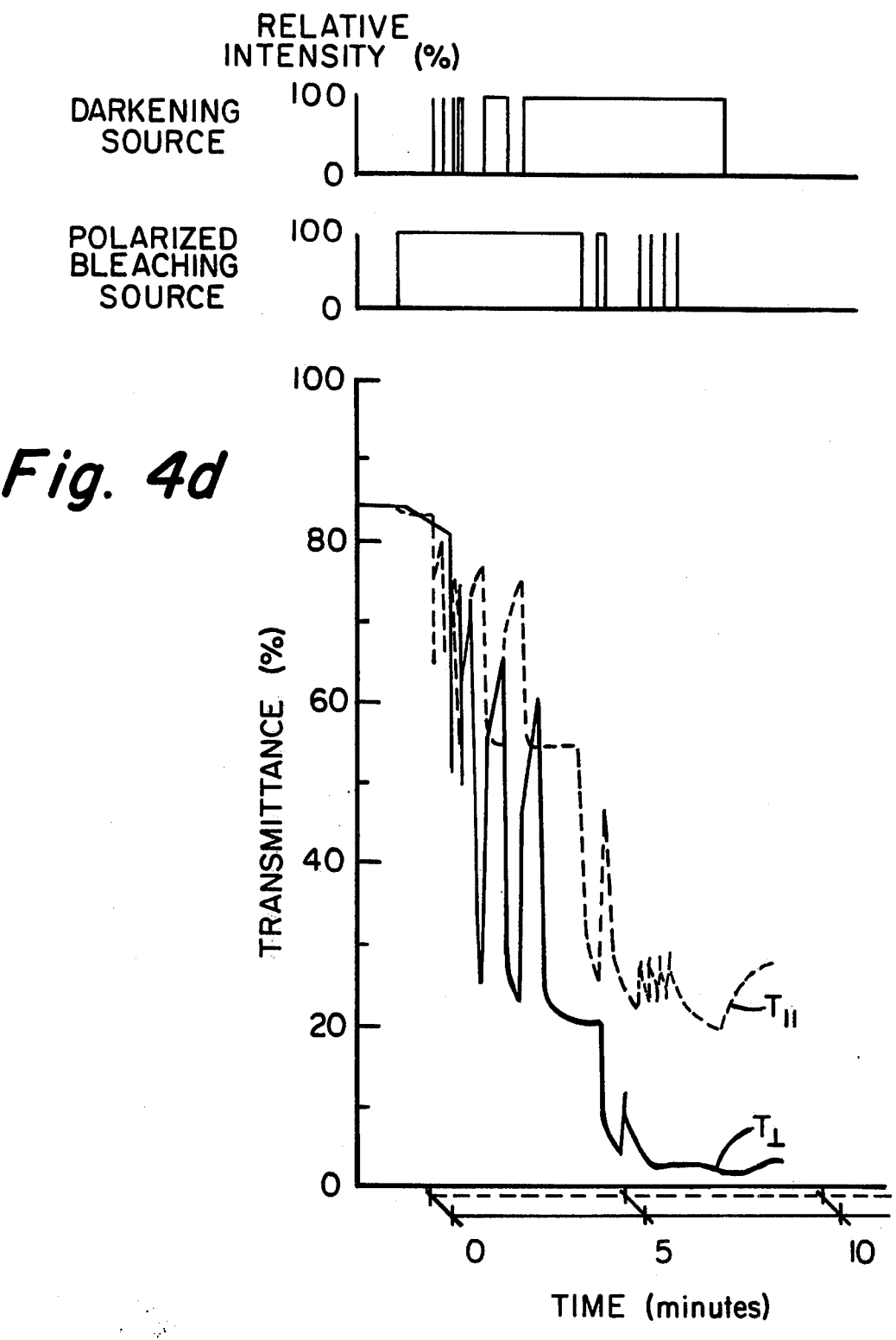

PHOTOCHROMIC GLASSES EXHIBITING DICHROISM, BIREFRINGENCE AND COLOR ADAPTATION

BACKGROUND OF THE INVENTION

The present invention is in the field of photochromic glass and is concerned with the treatment of photochromic glasses of the silver halide type to produce optically anisotropic glasses.

The basic disclosure relating to photochromic glasses is found in U.S. Pat. No. 3,208,860 to Armistead and Stookey. The glasses therein described may be briefly characterized as inorganic silicate glasses containing submicroscopic crystals of a silver halide, e.g., silver chloride, silver bromide or silver iodide. These crystals become darker in color when the glass is subjected to actinic radiation, such as ultraviolet light, but regain their original color when the actinic radiation is removed.

The behavior of silver halide photochromic glasses has been explained in terms of a photolytic reaction wherein the exposure of the glass-encased silver halide crystals to ultraviolet light causes the formation of light-absorbing minute silver particles in or on the silver halide phase. However, because the crystals are encased in a glassy matrix, the products of this reaction cannot diffuse away, and upon the removal of the activating light, the crystals return to the undarkened state.

Since the original inventon of silver halide photochromic glasses it has been verified that the photochromic behavior of silver halide crystals in glass is not closely limited by the composition of the host glass matrix in which the crystals are supported. Rather, a wide variety of silicate, borate and phosphate base glasses have been shown to be suitable for supporting a photochromic silver halide phase. And, while reversibly photochromic glasses comprising other photochromic phases such as copper-cadmium halides, hackamite, cerium, or europium have been developed, photochromic glasses of the silver halide type have become by far the most widely used of the photochromic glasses.

The fading of photochromic glasses from the darkened to the clear state in the absence of actinic radiation is explained in terms of the recombination of the silver metal produced by the photolytic decomposition with the halogen trapped at the silver halide crystal site by the matrix glass. The recombination is thought to occur by two independent processes. One involves a natural thermal recovery, accelerated by heating, which is referred to as thermal fading. The other occurs through exposure of the crystal site to light, typically though not always of longer wavelength (lower energy) than the actinic radiation which is used to darken the crystal, and is referred to as optical bleaching.

Factors affecting these two fading mechanisms are complex. In general, however, glasses which are photochromic because they contain silver halides can be optically bleached with varying degrees of efficiency depending upon the composition of the glass and upon the heat treatment used to precipitate the photochromic silver halide phase in the glass. Similarly, many of the silver halide photochromic glasses exhibit finite thermal fade rates.

A brief discussion of light polarization is also helpful in understanding our invention. In terms of the wave theory, light propagates with its characteristic electric E vector lying in a plane perpendicular to the direction of propagation. Linearly polarized light is light whose characteristic E vector is oriented in a fixed direction in this perpendicular plane. The state of polarization of the light is characterized by the relationship of this fixed directon to some reference direction, e.g., vertical or horizontal polarization with respect to the horizon, or perpendicular or parallel polarization with respect to a given axis in the plane.

A beam of natural light consists of all polarizations. That is, the direction of the E vector varies randomly in the plane perpendicular to the direction of propagation. At any instant the E vector may be resolved into components perpendicular and parallel to a selected reference direction in this plane. If one of these components is selectively absorbed as the beam of light passes through a medium, the light that is transmitted through the medium is considered to be linearly polarized. A medium having this property of selective absorption is called a polarizer.

The more common polarizers are composed of plastics, but glasses which linearly polarize light are also known. These glasses are also referred to as dichroic glasses, the term dichroic referring in this sense to the optical anisotropy of the glass with respect to its absorption coefficient. Thus light passing through such a glass experiences varying degrees of absorption, depending upon the direction of polarization of the light with respect to the glass. U.S. Pat. No. 2,319,816 to Land describes dichroic glasses produced by stretching glasses containing a minor metallic lead or gold phase. Polarizing glass comprising an elongated silver phase is described by Araujo and Stookey in *Applied Optics*, Volume 7, Number 5, pages 777–779 (1968).

Photochromic glasses which are non-polarizing in the clear state, but which polarize light in the darkened state, have been produced by stretching processes. Thus U.S. Pat. No. 3,540,793 to Araujo et al. describes stretched silicate glasses comprising parallel-oriented elongated crystals of silver halide which exhibit reversible photochromic and dichroic behavior. Also, Seward et al. describe, in U.S. Pat. No. 3,954,485, stretched copper-cadmium halide photochromic glasses exhibiting reversible polarizing properties.

Araujo et al. note that light polarized in a direction parallel to the direction of crystal elongation in their glasses is more strongly absorbed than light polarized in a direction perpendicular thereto, and suggest that the elongated crystals preferentially absorb light polarized in the direction of their alignment. Land indicates that anisotropic absorption in his glasses may occur over a wide range of light wavelengths, or may instead be limited to a rather narrow wavelength band, depending on the metal selected for incorporation in the stretched glass. Thus glasses which are strongly polarizing as to one wavelength band or color of light, but only weakly polarizing or non-polarizing with respect to other light wavelengths, have been produced.

Similar wavelength-dependent dichroism has been observed in silver chloride photographic emulsions which have been chemically or optically darkened and then bleached with polarized light. An early description of this phenomenon is provided by Cameron and Taylor in "Photophysical Changes in Silver-Silver Chloride Systems", *Journal of the Optical Society of America*, Volume 24, pages 316–330 (1934).

SUMMARY OF THE INVENTION

The present invention is founded upon the discovery that certain photochromic glasses may be rendered optically anisotropic in the darkened state through the use of linearly polarized bleaching light or its equivalent, as hereinafter defined. The optical anisotropy induced by the polarized bleaching light is manifested by dichroism, i.e., the absorption coefficient of the treated glass varies depending upon the direction of polarization of incoming light, and also by birefringence, in that the refractive index of the treated glass varies depending upon the direction of polarization of incoming light.

Broadly, a birefringent and dichroic photochromic glass article in accordance with the invention is produced by irradiating a photochromic glass containing silver halide in the photochromic phase with linearly polarized bleaching light while the glass is in an at least partially-darkened state. the polarized bleaching light is thought to act on the darkened silver halide crystals to modify their light-absorbing and light-refracting properties.

Some of the properties of glass treated as above described are as follows. First, we have observed that the degree of polarization of light by the darkened glass (polarization efficiency of dichroic ratio) is a function of the wavelength of that light. This behavior is demonstrated by measuring the transmission spectrum of the darkened glass with respect to linearly polarized light of two different orientations, one polarized parallel and the other perpendicular to the direction of polarization of the bleaching light used to induce dichroic behavior.

FIG. 1 of the drawing illustrates spectral transmittance curves for a photochromic glass in the darkened and undarkened states provided in accordance with the invention. Curve $T_o$ is the transmittance of the glass in the clear or undarkened state, while curves $T_{D11}$ and $T_{D1}$ are, respectively, the transmittance of parallel and perpendicularly polarized light while the glass is in the fully darkened state. The parallel transmittance $T_{D11}$ is found to be higher than the perpendicular transmittance $D_{D1}$ for long and intermediate wavelength light and equal at some shorter wavelength, in this case, about 400 nm.

The wavelength at which the two transmittances are equivalent depends on the glass, and upon the wavelength of the light used to bleach the glass. Also, the average of the two transmittances reaches a maximum at or near the wavelength of light used to bleach the glass, such that the glass tends to assume the color of the bleaching light. It should be noted that this coloration phenomenon does not require that the bleaching light be polarized, as will hereinafter more fully appear.

Secondly, we have observed that, depending upon the glass selected, the optical anisotropy induced by optical bleaching is at least partially and sometimes almost wholly retained by the darkened glass after terminating the treatment with polarized bleaching light. Thus the glass more or less permanently retains the property of light polarization as long as it is in the darkened or partially darkened state. Of course, if the glass is bleached or is allowed to fade to full clarity, it is no longer effective to polarize light because it no longer significantly absorbs light of any polarization.

Thirdly, and most surprisingly, we have discovered that a polarizing glass produced as described, when allowed to thermally fade to apparent complete clarity, will, upon redarkening with any conventional source of actinic radiation, regain all or some of the optical anisotropy which it exhibited before thermal fading. We have further found that this cycle can be repeated many times without wholly destroying anisotropy. Thus a glass article which is capable of reversibly changing from a clear, optically isotropic state to a darkened dichroic, birefringent state upon exposure to any source of actinic radiation may be provided.

Finally, it has been observed that any coloration induced by optical bleaching, whether or not the bleaching light is polarized, is retained while the glass is in the darkened state, and may be reacquired by the glass upon redarkening after the glass has been allowed to thermally fade to apparent clarity. Thus a photochromic glass reversibly exhibiting a selected color in the darkened state, which color differs from the normal dark state color of the glass, may be provided by irradiating the photochromic glass with colored optical bleaching light. This property may hereinafter be referred to as reversible color adaptation.

For the purpose of the present description, the normal dark state color of a photochromic glass is that color obtained upon complete darkening of the glass by u.v. irradiation after it has first been rendered photochromic by suitable heat treatment. Colored optical bleaching light is light consisting predominantly of only a limited range of light wavelengths in the visible spectrum.

It will readily be appreciated that the above-described optically-induced memory effects are useful for a wide variety of applications. Such applications include but of course are not limited to automatically darkening and polarizing glass lenses, panels, or enclosures, glass optical memories, and many others.

The extent of the optical anisotropy which is induced in accordance with the invention, as well as the fraction of that anisotropy which is retained after termination of the optical bleaching treatment, or which reappears upon redarkening after complete thermal fading, all depend on the photochromic characteristics of the glass, the wavelength of the polarized bleaching light, and the details of the bleaching treatment which is employed.

It should be noted that the retention of anisotropic and induced coloration effects through fading and redarkening of the treated glass typically requires that strong optical bleaching in use be avoided. Complete optical bleaching from a darkened dichroic or color-adapted state can erase the original optically-induced polarizing and coloring effects. Of course, this behavior can be used to advantage when it is desired to substitute different induced properties for the induced properties originally imparted to the glass.

It is presently believed that all photochromic glasses comprising crystals of a silver halide as the photochromic phase, when treated according to the method of the present invention, show at least some of the effect we have observed. However, as the effect is diminished, it becomes increasingly difficult to establish the presence of dichroic behavior, due to the inherent experimental uncertainties associated with present methods of measurement. This factor is not of critical importance however, since the present utility of very weakly polarizing or birefringent materials is limited.

As previously noted, the anisotropic properties of glass articles provided in accordance with the invention may be generated by subjecting a photochromic glass containing silver halide in the photochromic phase to linearly polarized optical bleaching light while the glass is in the darkened state. For this purpose the glass may be preliminarily darkened by exposure to a source of suitable actinic radiation, for example, ultraviolet light, and thereafter exposed to polarized optical bleaching light for a time sufficient to induce dichroic behavior therein, but insufficient to fully bleach the glass. However, as previously suggested, if treatment is extended such that the glass is permitted to become totally optically bleached during exposure to the polarized bleaching light, the optical anisotropy reappearing when the glass is redarkened with ultraviolet light is typically negligible.

We have found that the degree of polarization which is initially induced, as well as that fraction thereof which is retained after treatment, can be substantially increased if, for at least some time interval during the step of irradiating the glass with polarized bleaching light, the glass is coincidentally exposed to actinic radiation to promote darkening thereof. In this way the period of irradiation with polarized bleaching light may be substantially extended to enhance dichroism without fully bleaching the glass. Treatments wherein the intensities of the actinic radiation and/or optical bleaching light vary with time can be particularly effective in producing pronounced effects in many glasses.

Polarizing glasses provided in accordance with the present invention differ from prior art polarizing photochromic glasses such as described in U.S. Pat. No. 3,540,793 in a very important respect. Because they are not produced by stretching processes, the particles comprising the photochromic silver halide phase are not normally elongated, i.e., they typically have aspect ratios below 2:1. Moreover, even if somewhat elongated, the particles are randomly oriented (i.e., without discernible preferential alignment).

As a consequence of this fact, the present glasses, unlike the stretched glasses disclosed in U.S. Pat. No. 3,540,793, are truly optically isotropic (neither dichroic nor birefringent) in the clear state. Although the stretched glasses described in that patent are nonpolarizing in the clear state, they are not optically isotropic because the presence of preferentially aligned elongated refracting particles therein imparts birefringence to the clear as well as the darkened glass.

The mechanism by which optical anisotropy and color adaptation are induced by optical bleaching in photochomic glass containing silver halides has not been completely established. Nevertheless the following postulated mechanism is proposed as an aid to understanding and as a possible explanation of some of the effects observed. This explanation is tentative only and is not to be taken as limiting the scope of the invention defined by the appended claims.

It has been suggested that the darkening of silver halide photochromic glasses is accomplished by the growth of somewhat anisotropically-shaped aggregates of silver atoms randomly arranged in or on the silver halide particles. Stronger absorption of light, and thus preferential optical bleaching, occurs when the electric vector of the bleaching light is parallel to a particular axis of the silver aggregate. Hence, if linearly polarized bleaching light is used, the silver aggregates are selectively affected, the array of aggregates is no longer random in direction, and a polarizing material results.

The above-described effect of preferential bleaching is schematically illustrated in FIG. 2a of the drawing, wherein an article composed of a darkened photochromic glass comprising a multiplicity of randomly-oriented silver aggregates, depicted as dark segments, is represented. In the region of glass irradiated by the beam of linearly polarized light, preferential destruction of silver aggregates of appropriate size aligned in a direction parallel to the direction of polarization of the light (shown by the double arrow) will occur. The dissolving aggregates are represented by dashed segments.

The aggregates remaining after preferential bleaching are not randomly oriented in a plane perpendicular to the direction of travel of the bleaching light. Thus it can be seen that a beam of non-polarized light traversing the glass in a viewing direction paralleling the direction of the bleaching light will be rendered polarized by the selective action of the remaining aggregates.

Of course, it will be apparent from the foregoing that bleaching with unpolarized light can also cause optical anisotropy which will polarize any second beam of light subsequently traversing the glass in a direction differing from that of the bleaching light. Thus if one irradiates a photochromic glass containing silver halides with unpolarized light from a direction, for example, transverse to that of the viewing direction, a definite dichroic effect may be observed by the viewer.

The effects of such irradiation are illustrated in FIG. 2b of the drawing, wherein a vertical beam of unpolarized bleaching light traversing an article composed of photochromic glass is shown to preferentially bleach silver aggregates of appropriate size aligned in horizontal planes in the glass. The non-random orientation of the remaining aggregates with respect to the viewing direction is evident. This distribution of silver aggregates would be expected to produce a dichroic effect, and we have in fact experimentally observed such an effect.

Obviously, the physical processes involved in this technique are essentially identical to the processes which occur utilizing linearly polarized light, although the bleaching light used for the technique is not linearly polarized in the conventional sense. Thus, since the electric vectors of the bleaching light lie in horizontal planes with reference to the viewing direction, the anisotropic effects observed by the viewer are analogous to those which would be produced by horizontally polarized bleaching light entering the glass from the viewing direction. For this reason, such techniques are deemed to be equivalent to irradiation with linearly polarized bleaching light as herein described, to the extent utilized to provide optically-anisotropic photochromic glasses in accordance with the invention.

It is postulated that, in addition to the randomness of the orientation of the anisotropic aggregates of silver, there also exists a distribution of shapes, which distribution may vary from glass to glass as well as in accordance with darkening conditions. It is precisely the nature of this distribution which determines the darkened color of photochromic glasses in general. As a further result of this distribution, bleaching irradiation in a limited wavelength interval will result in a change in darkened coloration because of a selective destruction of those silver aggregates having appropriate shapes for preferential absorption of those wavelengths. Thus it is recognized that any silver halide-containing photochromic glass will exhibit a measure of dichroism and color adaptation, but the extent of dichroism and color adaptation will depend upon the degree of anisotropy of the silver aggregates produced upon darkening by ultraviolet light.

Since the wavelength of light which is most strongly absorbed varies with the anisotropy of the silver aggregate absorbing the light, it is not surprising that the wavelength of bleaching light which leads to the optimum dichroic ratio varies somewhat depending upon the glass and the heat treatment by which it is rendered photochromic. There is also considerable variation in the wavelengths that can be used to darken photochromic glass. In some cases, light which causes selected silver aggregates to be dissolved simultaneously causes other aggregates to form. In such cases the net effect of the irradiations may even be a darkening of the glass. Nevertheless, if the exciting light is polarized, polarization may also be induced. Thus monochromatic light may be used in certain instances to impart dichroism while simultaneously darkening the photochromic glass, an effect which we have experimentally observed. Since an optical bleaching process is involved in such cases and a dichroic effect is produced, this procedure is expressly included within the scope of our invention.

Finally, it should be understood from the foregoing that the induction of anisotropy by darkening and optically bleaching is a dynamic process. While some silver aggregates are being destroyed, others are growing. Hence, if one wishes to change the direction of polarization of the glass at some time subsequent to the initial optical bleaching treatment, one may simply repeat the process using bleaching light polarized in a different direction. By the same token, one may change the darkened color of the photochromic glass by bleaching with light of a different color.

DESCRIPTION OF THE DRAWINGS

The invention may be further understood by reference to the drawings, wherein

FIG. 2a of the drawing is a schematic perspective view of an article composed of a darkened photochromic glass exposed in part to a beam of polarized bleaching light. The bleaching light is polarized in a horizontal direction as shown by the double arrow on the surface of the glass representing the plane of the electric vector of the impinging polarized light. The glass comprises a multiplicity of randomly-oriented silver aggregates shown as dark segments.

Figure 1:
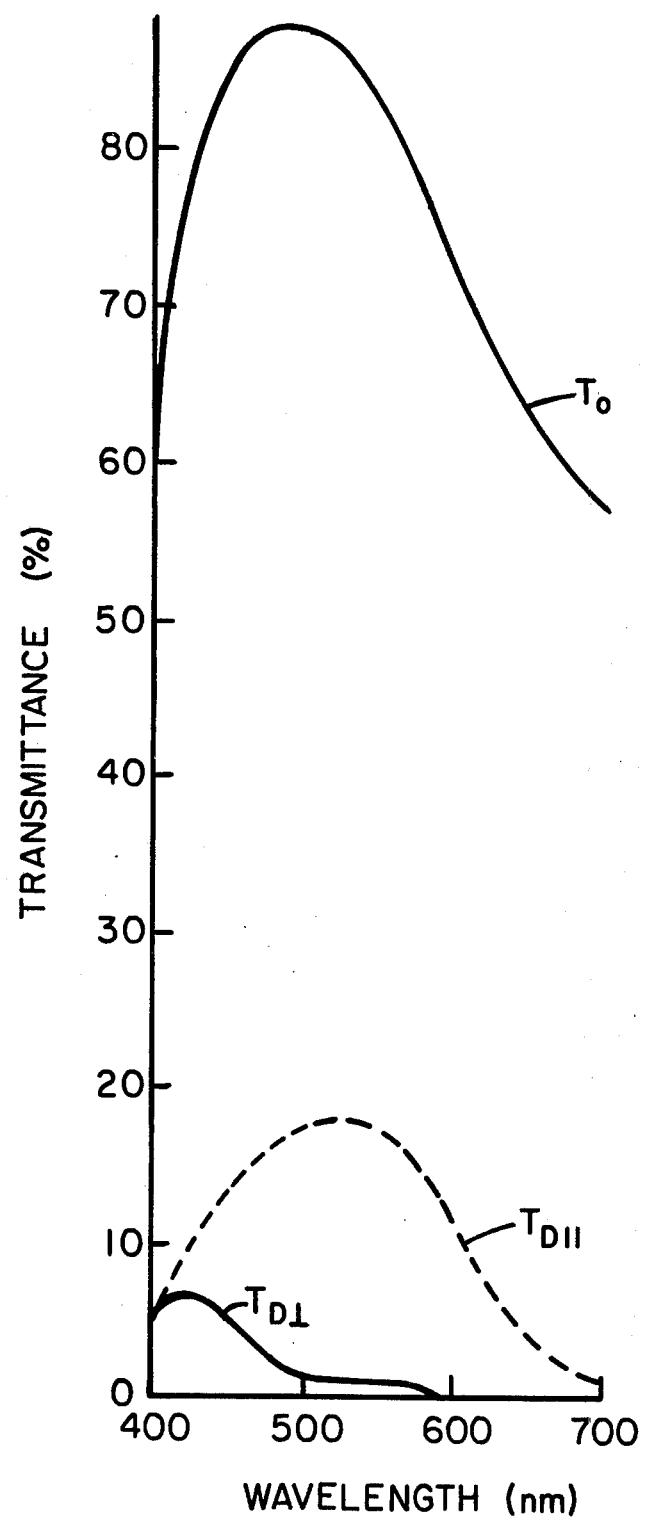
FIG. 1 is a graph showing the visible light transmittance of a dichroic, birefringent glass article provided in accordance with the invention as a function of the wavelength of the incident light. Three transmittance curves are shown: one for the glass while it is in the clear or undarkened state, one for the darkened glass for light polarized in a direction parallel to the direction of polarization of the bleaching light used to make the glass dichroic ($T_{D||}$), and one for the darkened glass for light polarized in a direction perpendicular thereto ($T_{D\perp}$). The wavelength dependence of both the parallel and perpendicular transmittance is readily apparent.

In the region of the darkened photochromic glass intersected by the polarized bleaching light, preferential destruction of silver aggregates of appropriate size aligned in a direction parallel to the direction of polarization of the bleaching light occurs. The dissolving silver aggregates are shown as dashed segments. The silver aggregates remaining in the preferentially bleached region exhibit non-random orientation as seen from the indicated viewing direction, and thus selectively absorb and polarize light parallel to the viewing direction with subsequently traverses the bleached region of the glass. (The particles are shown as prolate, but any axially axymmetric particle would show the effect.)

FIG. 2b of the drawing is a schematic perspective view of an article composed of a darkened photochromic glass as in FIG. 2a, wherein the randomly-oriented silver aggregates are again depicted as dark segments. The glass is exposed in part to a vertical beam of unpolarized bleaching light, the electric vectors of the impinging light being randomly disposed in a horizontal plane as shown by the arrows at the glass surface.

Although the bleaching light is not linearly polarized, preferential destruction of silver aggregates of appropriate size which lie parallel to horizontal planes in the glass (perpendicular to the direction of propagation of the bleaching light) occurs, because the electric vectors of the bleaching light are all horizontally directed. The dissolving aggregates are represented by dashed segments.

The aggregates remaining after preferential bleaching exhibit non-random orientation when viewed from a direction other than the direction of the bleaching light, for example, from the viewing direction shown. Thus light traversing the glass in the indicated viewing direction is selectively absorbed and polarized.

Figure 3:
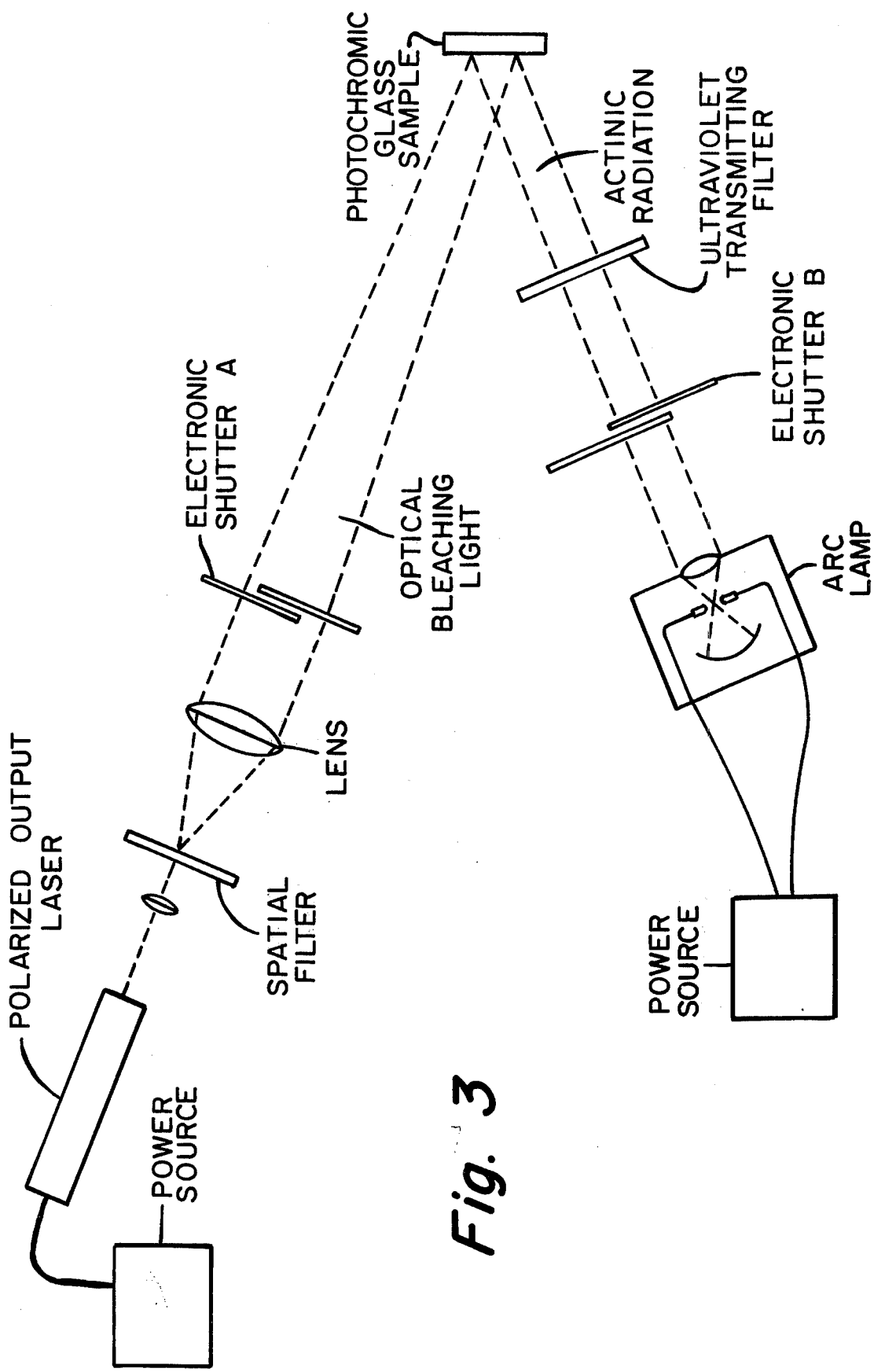

FIG. 3 of the drawing is a schematic illustration of one system useful for producing dichroic birefringent glass in accordance with the invention, wherein the source of optical bleaching light consists of a polarized output laser, the light output of which passes through a spatial filter and is focused by a lens upon a glass sample to be treated. The intervals of exposure of the glass sample to this source are controlled by electronic shutter A. The source of actinic radiation consists of an arc lamp, the light output of which is passed through an ultraviolet transmitting filter and then focused upon the glass sample. The intervals of exposure of the glass sample to the actinic radiation are controlled by electronic shutter B, which operates independently of shutter A.

FIGS. 4a, 4b, 4c, 4d and 4e of the drawing are diagrammatic representations of various processes for providing a dichroic, birefringent glass article in accordance with the invention. Each representation includes a graph of polarized bleaching light intensity, a graph of darkening ultraviolet light intensity, and a graph of the light transmittance of the glass, all as a function of treating time. Two components of transmittance are shown: transmittance with respect to light polarized parallel to the direction of the bleaching light ($T_{||}$), and transmittance with respect to light polarized perpendicularly thereto ($T_\perp$). The transmittance measurements are made at a wavelength of 533 nm. The sequences of controlled-duratin darkening and bleaching pulses are represented in the graphs of darkening light and bleaching light intensity. These pulses produce the simultaneous transmittance variations shown in the transmittance graphs. The considerable differences in perpendicular and parallel transmittances resulting from these treatments give rise to the substantial dichroism observed.

FIGS. 5a, 5b, 5c, 5d and 5e of the drawing are spectral transmittance curves of darkened photochromic glasses which illustrate the color adaptation resulting when colored polarized optical bleaching light is used to induce dichroism therein. Each figure consists of two spectral transmittance curves; one for light polarized parallel to the direction of polarization of the colored bleaching light ($T_{D11}$) and one for light polarized in a direction perpendicular thereto ($T_{D1}$). Each figure illustrates the effect of a different bleaching color, with the wavelengths of the bleaching light being indicated by arrows in each case. The substantial differences in the shapes of the $T_{D11}$ curves produce glasses exhibiting very different colors in the darkened state.

Figure 6:
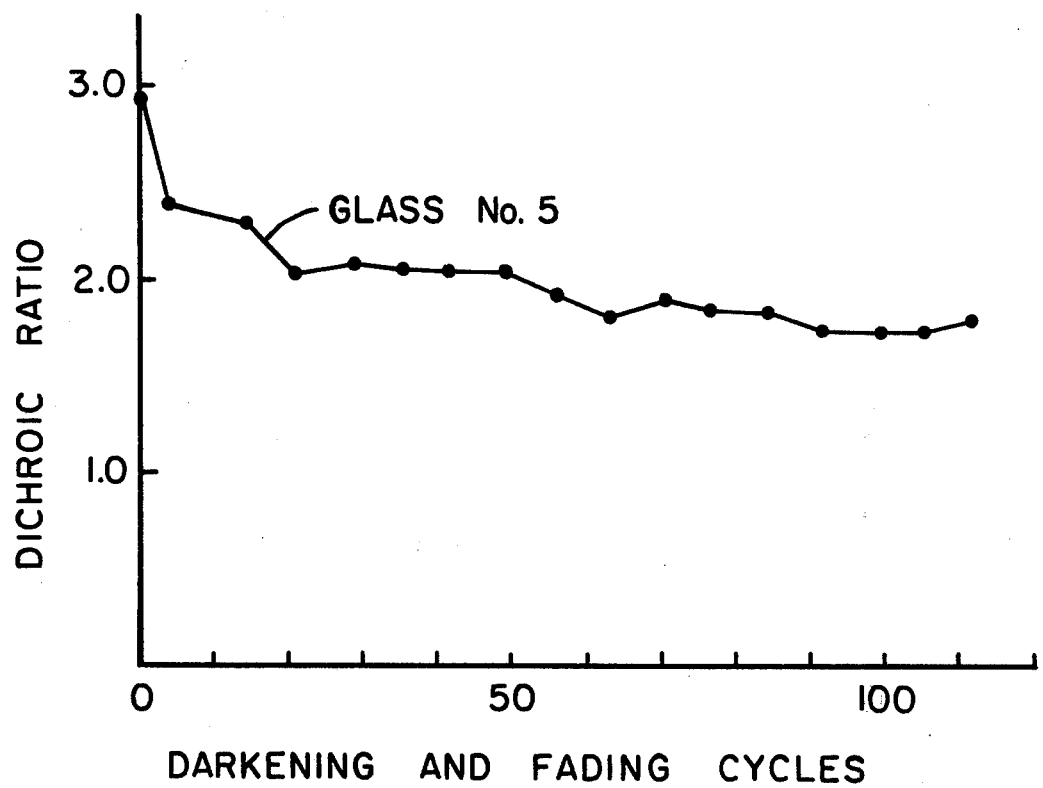

FIG. 6 of the drawing illustrates the resistance to fatigue, upon repeated cycling from the clear to the darkened state, of the polarizing property of one dichroic, birefringent photochromic glass provided according to the invention. Each darkening and fading cycle indicated on the horizontal axis of the graph constituted darkening by exposure to direct sunlight followed by thermal fading at ambient temperatures in the absence thereof. The data plotted is with respect to Glass No. 5 described in Tables I and III below. The dichroic ratios indicated on the vertical axis of the graph were determined from parallel and perpendicular transmittance measurements taken after darkening the glass with an ultraviolet source.

DETAILED DESCRIPTION

Both glass composition and heat treatment affect the way in which light interacts with silver-halide-containing photochromic glasses. However the number of possible composition and heat treating variables is so large that fundamental rules for predicting the degree of optical anisotropy which can be induced in a selected glass are difficult to establish. We have found, however, that susceptibility to the production of optical anisotropy according to the invention is not limited to any particular field of host glass composition or heat procedure. Good dichroic ratios have been observed in many silicate systems as well as in glasses which are primarily phosphates and borates. Factors tending to affect induced anisotropy and color adaptation include not only chemical changes and the heat treatment used to precipitate the silver halide phase, but also subsequent thermal or radiation treatments which may effect the structure of that phase. High energy irradiation, for example, is a process which can substantially alter both the anisotropy and the total photochromic behavior of the glass.

The manufacture of a photochromic glass article exhibiting high polarization efficiency is facilitated if a powerful source in linearly-polarized bleaching light is used. Among the sources of bleaching light which have been effectively employed are lasers, tungsten-halogen lamps, xenon and mercury arc lamps, and sunlight. Linear polarization of light from bleaching sources such as described may suitably be accomplished by plastic or crystal polarizing media or a Brewster angle pile of plates. Alternatively, a polarized laser source may be used.

Among the sources of ultraviolet light which may be used to darken the photochromic glass prior to or during the bleaching treatment are sunlight and xenon and mercury arc lamps.

As previously noted, coincident exposure of the photochromic glass to actinic radiation during the optical bleaching treatment is quite useful in extending the bleaching treatment to obtain high levels of anisotropy in the darkened glass. A wide variety of such optical treatments may be employed, including one such treatment wherein optical bleaching light is directed upon darkened photochromic glass, and the glass is then darkened by simultaneous exposure to actinic radiation to provide color centers for preferential bleaching by the bleaching light.

Figure 4A:
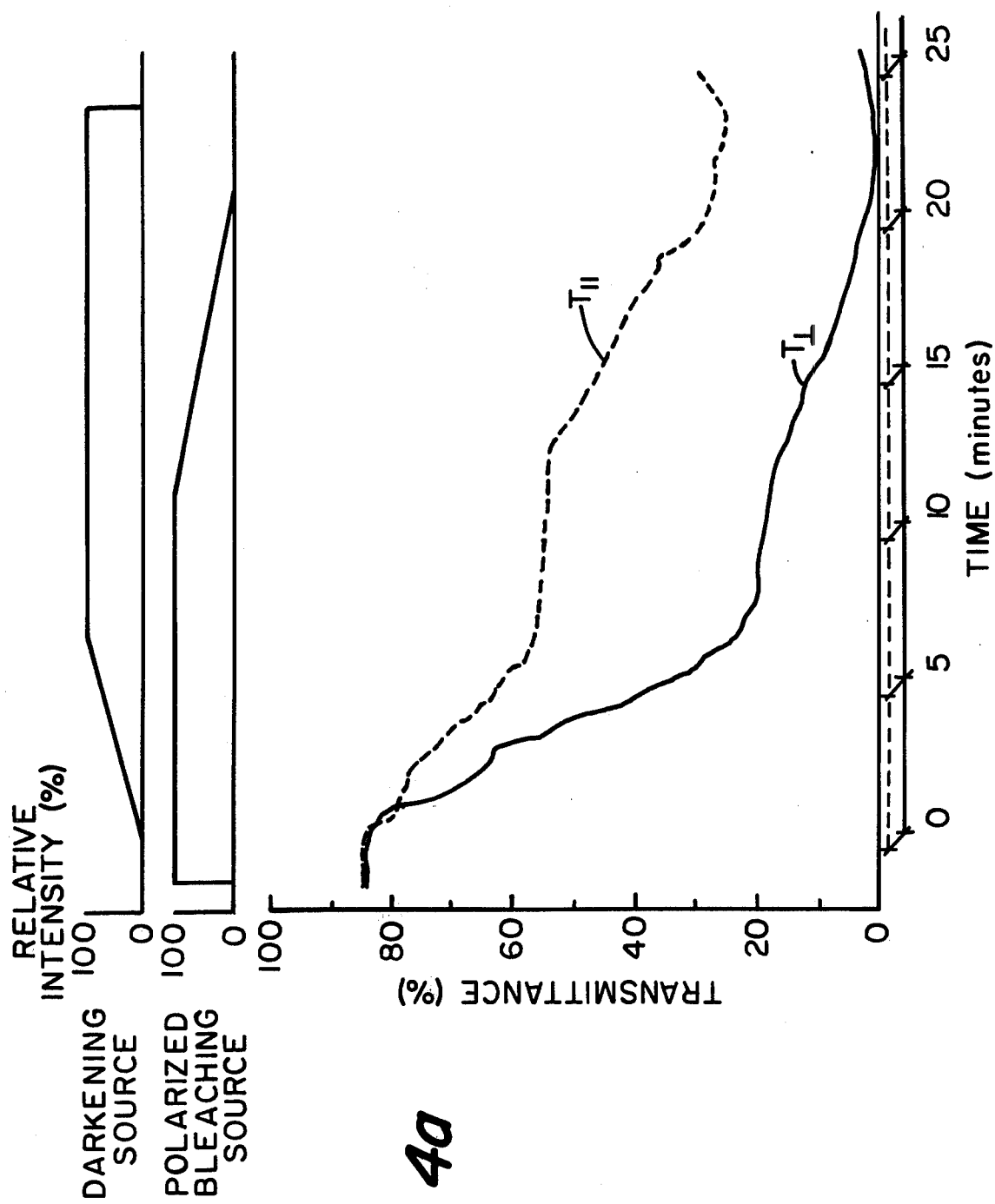
Figure 4B:
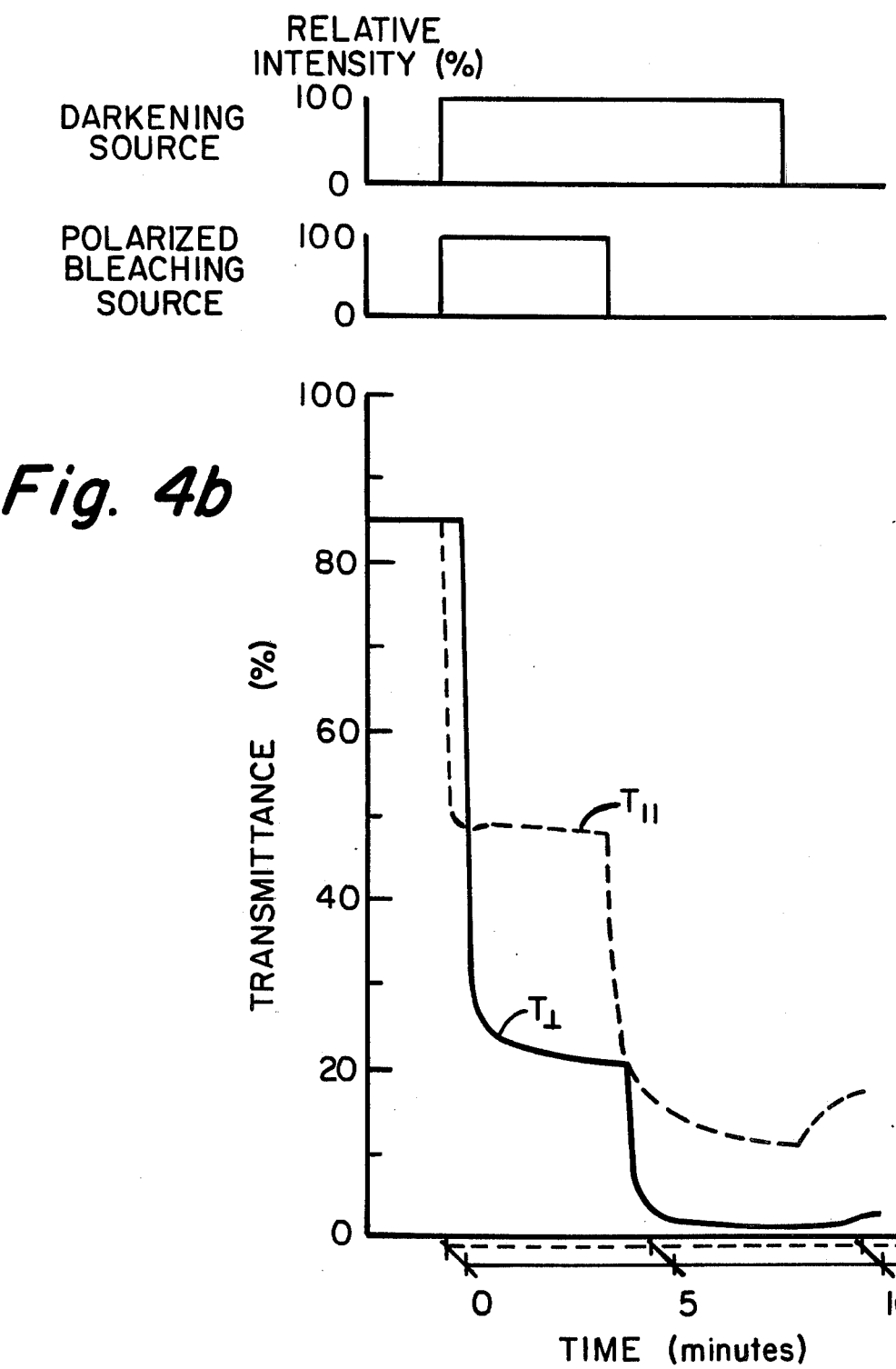
Figure 4E:
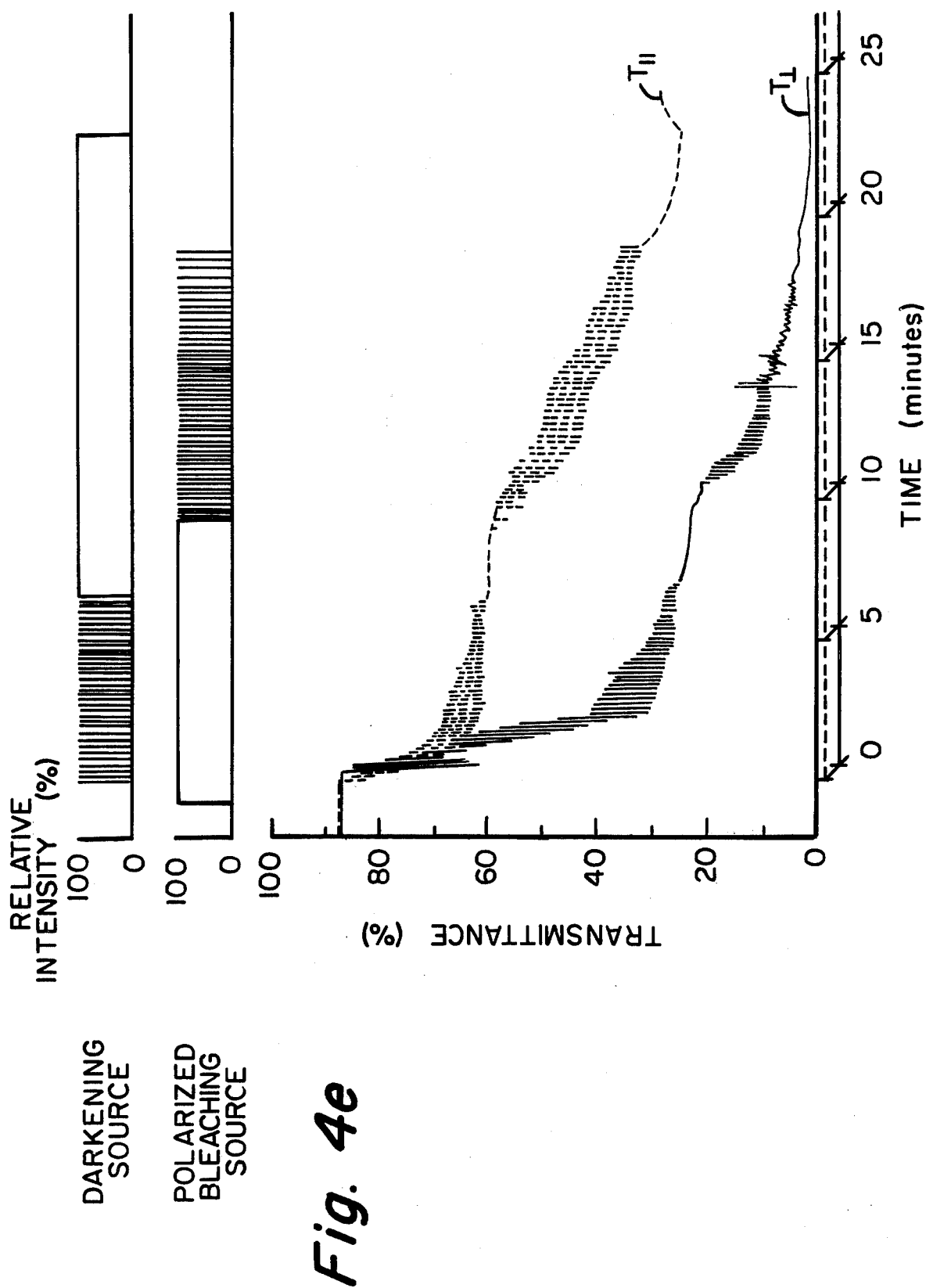
Figure 5A:
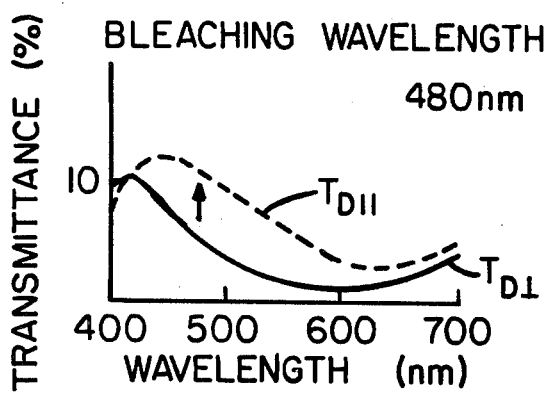
Figure 5B:
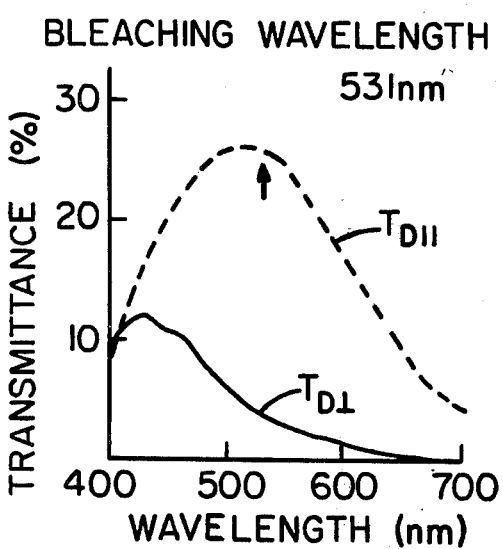
Figure 5C:
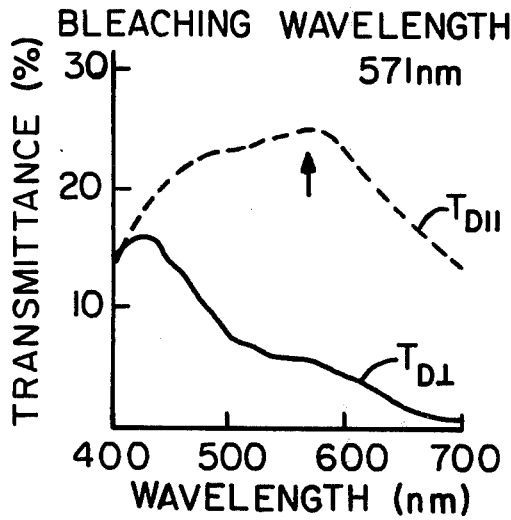
Figure 5D:
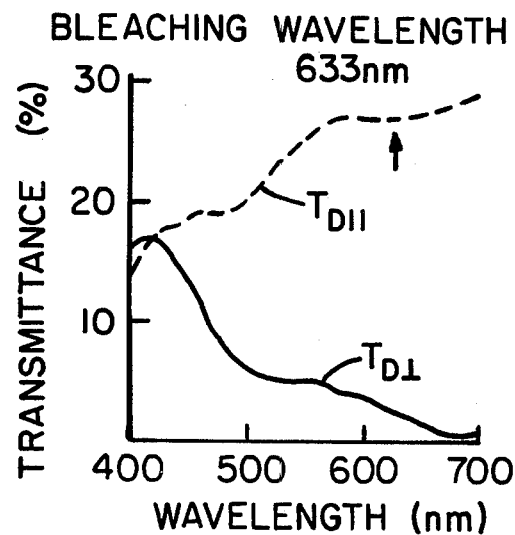
Figure 5E:
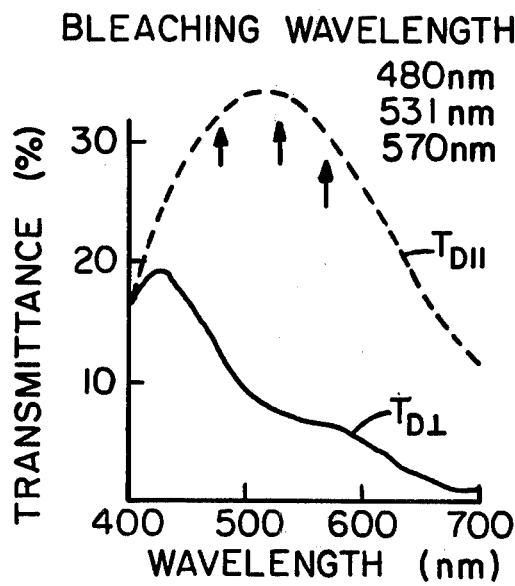

The level of dichroism can be further enhanced in certain cases by varying the exposure to actinic and bleaching radiation with time. Particularly useful are processes wherein the undarkened glass is exposed to light comprising an intense bleaching component, which is gradually diminished in the course of treatment, and a weak actinic component, which is gradually intensified in the course of treatment. The variations in exposure to each component may involve light pulsations of increasing or decreasing duration, as in FIGS. 4d and 4e of the drawing, or continuous intensification or extinction as in FIG. 4a of the drawing. Examples of other types of processes which may be used are illustrated in FIGS. 4b and 4c of the drawing.

Measurement of the dichroic effects produced in silver halide photochromic glass is typically accomplished utilizing a weak probing beam of light. Independent sensors are used to separately determine the transmittance of the glass with respect to light components polarized parallel to the direction of polarization of the bleaching light and light components polarized perpendicularly thereto. The transmittance of each component is conventionally defined as the ratio of the intensity of the transmitted light I to that of the incident light $I_o$. For this purpose, transmittance is typically measured with respect to a representative light wavelength of 533 nm, although corresponding results are obtained by measuring white light transmittance.

The polarizing effectiveness of the glass is typically reported in terms of the observed polarization efficiency in the darkened state, expressed as a percent. Polarization efficienty PE is defined as:

$$PE = \frac{T_{D11} - T_{D1}}{T_{D11} + T_{D1}} \times 100$$

where $T_{D11}$ is the transmittance of the darkened glass with respect to light polarized parallel to the direction of polarization of the bleaching light and $T_{Dl}$ is the transmittance of the darkened glass measured with respect to light polarized perpendicularly thereto.

The polarization efficiency of a sample of photochromic glass depends not only on the inherent absorption characteristics of the glass, but also upon factors such as sample thickness and the level of induced darkening, both of which affect the absolute transmittance of the sample. Therefore we also record the dichroic ratio of the darkened glass, a measure of anisotropy which is more nearly independent of these factors. We define the dichroic ratio (R) of a photochromic glass as:

$$R = \frac{\ln(\frac{T_0}{T_{D1}})}{\ln(\frac{T_0}{T_{D11}})}$$

$T_o$ being the undarkened transmittance of the glass and $T_{D1}$ and $T_{D11}$ being the transmittance of the darkened glass with respect to light polarized parallel and perpendicular to the direction of polarization of the bleaching light as hereinabove defined. This definition is particularly useful for comparing clear glasses exhibiting high undarkened transmittance values ($T_o$).

Some specified examples of photochromic glasses which may be rendered dichroic and birefringent in accordance with the invention are set forth in Table I below. The compositions of the glasses are reported in parts by weight on the oxide basis as calculated from the batch, except for silver and the halogens which are reported on an elemental basis in accordance with conventional practice. Also reported are melting temperatures suitble for melting each composition, and annealing temperatures useful for each glass.

Glasses of the compositions shown in Table I may be provided in accordance with well known glass manufacturing techniques. Batches for the glass may be compounded from conventional glass batch constituents, including oxides or other compounds which are thermally decomposable to the specified oxides or elements at the temperatures utilized for melting the batch. The batches may be melted in pots, tanks, crucibles or other melting units at suitable temperatues and thereafter formed into glass articles by techniques such as pressing, rolling, drawing or spinning at viscosities suitable for these forming processes.

Glasses such as shown in Table I may be, but usually are not, photochromic as formed and annealed. Thus they are typically subjected to a heat treatment subsequent to forming to promote the development of a silver halide crystal phase in the glass. This heat treatment is conventional and may comprise exposure of the glass to temperatures between the glass strain point and the glass softening point for a time sufficient to develop the desired photochromic properties in the glass, normally in the range of ¼–16 hours.

Specific heat treatments which may be used to develop photochromic properties in the glasses shown in Table I are also reported therein, including heating temperatures and holding times in minutes for each treatment. Two temperatures and times are reported in cases where two-step treatments comprising a low temperature and subsequent high temperature holding interval are utilized.

TABLE I

Photochromic Glasses

| Glass No. | 1 | 2 | 3 | 4 | 5 | 6 | 7 | 8 | 9 | 10 |
|---|---|---|---|---|---|---|---|---|---|---|
| $SiO_2$ | 61.1 | 61.1 | 61.1 | 61.1 | 60.9 | 61.0 | 61.8 | 27.2 | 3.9 | — |
| $Al_2O_3$ | — | — | — | — | 9.6 | 9.6 | 8.0 | 22.8 | 30.3 | 6.7 |
| $B_2O_3$ | 25.5 | 25.5 | 25.5 | 25.5 | 17.1 | 16.4 | 15.1 | 0.8 | 1.5 | 63.4 |
| $P_2O_5$ | | | | | | | | 31.8 | 43.5 | 7.6 |
| $Li_2O$ | | | | | 1.9 | | 3.2 | | | |
| $Na_2O$ | | | | | 4.5 | 13.0 | 7.1 | 7.0 | 6.9 | 17.1 |
| $K_2O$ | 13.4 | 13.4 | 13.4 | 13.4 | 5.9 | | | 10.4 | 13.9 | |
| PbO | | | | | | | 4.7 | | | |
| BaO | | | | | | | | | | 3.4 |
| $ZrO_2$ | | | | | | | | | | 1.3 |
| CuO | 0.016 | 0.016 | 0.016 | 0.054 | 0.016 | 0.016 | 0.018 | 0.036 | 0.036 | 0.016 |
| Ag | 0.3 | 0.3 | 0.3 | 0.3 | 0.5 | 0.5 | 0.54 | 0.1 | 0.1 | 0.43 |
| F | | | | | | 1.5 | | 0.75 | 0.75 | — |
| Cl | 0.18 | 0.18 | 0.54 | 0.18 | 0.5 | 0.5 | 0.72 | 0.6 | 0.6 | 1.0 |
| Br | | | | | | | | — | 0.3 | — |
| Melting Temp. | 1475° C | 1475° C | 1475° C | 1475° C | 1450° C | 1500° C | 1450° C | 1350° C | 1350° C | 1150° C |
| Annealing Temp | 425° C | 425° C | 425° C | 500° C | 435° C | 475° C | 400° C | 425° C | 425° C | 300° C |
| Heat Treatment (° C-min.) | 500°–30' 700°–30' | 500°–30' 650°–30' | 500°–30' 700°–30' | 500°–30' 700°–30' | 550°–30' 650°–45' | 550°–30' 650°–30' | 550°–30' 600°–45' | None | None | 525°–60' |

| Glass No. | 11 | 12 | 13 | 14 | 15 | 16 | 73 | 18 | 19 | 20 |
|---|---|---|---|---|---|---|---|---|---|---|
| $SiO_2$ | 62.2 | 58.1 | | 3.3 | 60.9 | 47.2 | 51.1 | 55.8 | 7.9 | 65.4 |
| $Al_2O_3$ | 9.8 | 9.2 | 23.0 | 15.2 | | | | | 13.3 | 8.3 |
| $B_2O_3$ | 18.2 | 17.0 | 38.3 | 8.3 | 24.7 | 21.3 | 23.0 | 22.5 | 30.7 | 12.8 |
| $P_2O_5$ | | | | 63.1 | | | | | | |
| $Li_2O$ | 1.9 | 1.8 | | | | | | | | 3.9 |
| $Na_2O$ | 7.9 | 5.6 | | 3.2 | | | | | | 8.7 |
| $K_2O$ | | | | | 14.3 | 12.3 | 13.3 | 15.7 | | |
| $Cs_2O$ | | 8.4 | | | | | | | | |
| Mgo | | | | 2.7 | | | | | | |
| BaO | | | 38.7 | | | | | | | |
| $La_2O_3$ | | | | | | | | | 24.5 | |
| ZnO | | | | | | | | | 23.5 | |
| CdO | | | | 2.0 | | | | | | |
| $ZrO_2$ | | | | | | | | 6.0 | | |
| $Nb_2O_5$ | | | | | | | 12.6 | | | |
| $Ta_2O_5$ | | | | | | 19.3 | | | | |
| CuO | 0.016 | 0.032 | 0.016 | 0.14 | 0.024 | 0.024 | 0.024 | 0.024 | 0.020 | 0.12 |
| Ag | 0.5 | 0.5 | 0.8 | 0.28 | 0.3 | 0.3 | 0.3 | 0.3 | 0.75 | 0.54 |
| F | | | | 0.05 | | | | | 0.35 | 0.72 |
| Cl | 0.5 | 0.5 | 0.5 | 2.7 | 0.18 | 0.18 | 0.18 | 0.18 | 0.80 | |
| Br | | | | | | | | | | 0.13 |
| I | | | | | | 0.11 | | | | |
| Melting Temp. | 1450° C | 1450° C | 1300° C | 1500° C | 1400° C | 1500° C | 1500° C | 1500° C | 1200° C | 1450° C |
| Annealing Temp. | 475° C | 435° C | 575° C | 450° C | 425° C | 500° C | 500° C | 500° C | 500° C | 400° C |
| Heat Treatment (° C-min.) | 550°–30' 630°–30' | 550°–30' 630°–45' | 600°–30' 650°–30' | 620°–45' | 550°–30' 700°–30' | 725°–30' | 575°–30' 675°–30' | 575°–30' 675°–30' | 700°–60' | 600°–16' |

| Glass No. | 21 | 22 | 23 | 24 | 25 | 26 | 27 | 28 | 29 | 30 |
|---|---|---|---|---|---|---|---|---|---|---|

TABLE I-continued

Photochromic Glasses

| | | | | | | | | | | |
|---|---|---|---|---|---|---|---|---|---|---|
| SiO₂ | 3.8 | 60.6 | 62.2 | 62.2 | 65.6 | 70.9 | 46.8 | 53.8 | | |
| Al₂O₃ | 1.0 | | 9.8 | 9.8 | 8.3 | 12.0 | 4.1 | 10.4 | 0.7 | 0.3 |
| B₂O₃ | 21.3 | 25.3 | 18.2 | 18.2 | 12.8 | 2.3 | 8.9 | 20.2 | 29.5 | 36.9 |
| Li₂O | | | 1.9 | 1.9 | 4.0 | | 2.9 | 2.8 | | |
| Na₂O | | | 7.9 | 7.9 | 11.8 | 9.4 | 5.8 | 10.1 | | |
| K₂O | | 13.3 | | | | 0.7 | 0.3 | 0.4 | | |
| CaO | | | | | 1.2 | | | | | |
| SrO | | | | | | | | | 9.9 | |
| La₂O₃ | 49.7 | | | | | | | | 59.1 | 51.8 |
| CdO | 0.7 | | | | | | 1.5 | 2.0 | 0.8 | 1.3 |
| ThO₂ | | | | | | | | | | 9.7 |
| Ta₂O₅ | 23.6 | | | | | | 30.0 | | | |
| WO₃ | | 0.8 | | | | | | | | |
| As₂O₃ | | | .43 | | | | 0.13 | | | |
| Sb₂O₃ | | | | .29 | | | | | | |
| CuO | 0.032 | 0.016 | 0.016 | 0.016 | 0.24 | — | 0.28 | 0.032 | 0.032 | 0.032 |
| Ag | 0.75 | 0.30 | 0.5 | 0.5 | 0.54 | 0.47 | 0.37 | | 0.75 | 0.75 |
| F | 0.50 | — | — | — | — | 0.64 | 0.4 | 0.5 | 0.50 | — |
| Cl | 0.30 | 0.18 | 0.5 | 0.5 | 0.72 | 0.65 | 0.47 | .4 | 0.50 | 0.75 |
| Br | | | | | 0.13 | | | 0.03 | .2 | |
| Se | | | | | | 5 | | | .2 | |
| Melting Temp. | 1250° C | 1475° C | 1450° C | 1450° C | 1450° C | 1250° C | 1250° C | 1300° C | 1250° C | 1250° C |
| Annealing Temp. | 650° C | 500° C 650° C | 435° C | 435° C | 400° C | 450° C | 550° C | 500° C | | |
| Heat Treatment | 750° C-60' | 575° - 30' 700° - 30' | 550° - 30' 630° - 30' | 550° - 30' 630° - 30' | 550° - 30' 630° - 30' | None | 650° - 45' | — | 700° - 60' | 725° - 60' |

| Glass No. | 31 | 32 | 33 | 34 |
|---|---|---|---|---|
| SiO₂ | 9.3 | 9.3 | 9.3 | 9.3 |
| B₂O₃ | 26.3 | 30 | 33 | 38 |
| La₂O₃ | 34.5 | 34 | 23 | 9.0 |
| ZnO | 39.3 | 36 | 44 | 53 |
| CaO | 0.9 | 0.9 | 0.9 | 0.9 |
| CuO | 0.023 | 0.024 | 0.024 | 0.024 |
| Ag | 0.6 | 0.6 | 0.6 | 0.6 |
| Cl | 0.8 | 0.8 | 0.8 | 0.8 |
| F | 0.3 | 0.3 | 0.3 | 0.3 |
| Melting Temp. | 1200° C | 1200° C | 1200° C | 1200° C |
| Annealing Temp. | 550° C | 550° C | 550° C | 550° C |
| Heat Treatment (° C-min.) | 635° - 45' | 635° - 45' | 635° - 45' | 635° - 45' |

Glass No. 26 of the above table is an example of a photochromic glass which exhibits substantial darkening in response to short and intermediate wavelength visible light. Glass No. 28 contains no silver in its composition and is not photochromic as made. However silver may be introduced into the surface of this glass by immersing a 2 mm thick sample thereof in a molten salt bath consisting of 36% AgNO₃ and 64% NaNO₃ by weight at 280° C. for 8 hours. Thereafter, the silver-containing surface layer is rendered photochromic by heating the glass sample at 650° C. for 1 hour.

Photochromic glass articles produced using the glass compositions and heat treatments shown in Table I may be treated to induce optical anisotropy in accordance with a variety of darkening and bleaching procedures. Many different sources of polarized bleaching light and, optionally, darkening radiation may be used, and the exposure of the glass to these light sources may vary considerbly as to both duration and intensity. Some examples of combinations of darkening and bleaching sources which may be used in a system such as shown in FIG. 3 of the drawing for the purpose of administering optical treatments such as illustrated in FIGS. 4a–4e of the drawing are set forth in Table II below. Included in Table II are an identifying designation for each combination, a description of each darkening source; a description of each polarized bleaching source, including principal emitted wavelengths for each source; and an integrated beam power level for each laser bleaching beam, as calculated from the amount of light therefrom incident on the glass samples treated.

TABLE II

Light Source Combinations for Optical Treatments

| Light Source Combination | Darkening Source | Polarized Bleaching Source | Incident Bleaching Power |
|---|---|---|---|
| A | 100 watt Mercury Arc; (ultraviolet component) | Helium-Neon laser (633 nm) | 0.15 watts - cm.² |
| B | " | Krypton laser (480 nm, 531 nm, 570 nm) | 0.5 watts - cm.² |
| C | " | " | 0.6 watts - cm.² |
| D | " | " | 0.78 watts - cm.² |
| E | " | Krypton laser (531 nm) | 0.2 watts - cm.² |
| F | " | Krypton laser (647 nm) | 0.8 watts - cm.² |
| G | 1000 watt Xenon-Mercury Arc (ultraviolet component) | 1000 watt Xenon-Mercury Arc (visible component) | — |
| H | 450 watt Xenon Arc | | |

TABLE II-continued

| Light Source Combinations for Optical Treatments | | | |
|---|---|---|---|
| Light Source Combination | Darkening Source | Polarized Bleaching Source | Incident Bleaching Power |
| | (ultraviolet component) | Helium-Neon laser (633 nm) | 0.15 watts - cm.$^2$ |

The optical anisotropy induced utilizing light source combinations such as described in Table II above is conveniently measured by calculating the dichroic ratio and polarizing efficiency of each glass sample from the undarkened transmittance and the darkened parallel and perpendicular polarized light transmittances thereof. Table III below sets forth treating data pertaining to samples of the photochromic glasses shown in Table I, heat treated as therein described, which were subjected to optical treatments utilizing the light source combinations shown in Table II. Table III reports the number of the glass, as recorded in Table I, a designation for a light source combination utilized for the optical treatment, corresponding to the combination of the same designation shown in Table II, and the transmittance of the undarkened photochromic glass ($T_o$). Also reported are the transmittance of the fully darkened photochromic glass at the completion of the optical treatment, including transmittance with respect to light polarized in a direction parallel to the direction of polarization of the bleaching light ($T_{D11}$) and transmittance with respect to light polarized perpendicularly thereto ($T_{Dl}$). Finally, the dichroic ratio (R) and polarizing efficiency (P.E.) of each glass, calculated as hereinabove described, are reported.

The thickness of the glass samples utilized for the optical treatments was about 2 mm. The combination of darkening and bleaching exposure intervals constituting the optical treatment in each case was essentially that combination illustrated in FIG. 4d of the drawing.

TABLE III

Properties of Optically Treated Photochromic Glasses

| Glass No. (Table I) | 1 | 1 | 2 | 3 | 4 | 5 | 6 | 6 | 7 | 8 | 9 | 10 | 11 | 12 | 13 | 14 | 15 |
|---|---|---|---|---|---|---|---|---|---|---|---|---|---|---|---|---|---|
| Light Source Combination (Table II) | A | C | A | A | A | C | A | C | C | A | A | G | E | C | A | A | A |
| $T_o$ | 86.9 | 91.2 | 89.2 | 88.6 | 87 | 83.0 | 86.3 | 80.5 | 87.6 | 82.4 | 83.1 | 70.4 | 92.0 | 82.5 | 82.0 | 75.0 | 85.0 |
| $T_{Dl}$ | 11.4 | 27.0 | 13.6 | 29.2 | 29.5 | 6.0 | 13.0 | 13.0 | 3.1 | 20.9 | 5.9 | 7.8 | 12.5 | 5.0 | 11.7 | 14.7 | 20.3 |
| $T_{D11}$ | 21.6 | 32.3 | 16.8 | 31.0 | 32.5 | 33.5 | 34.2 | 33.7 | 9.8 | 33.2 | 7.0 | 22.4 | 30.5 | 22.0 | 19.8 | 27.6 | 27.3 |
| Dichroic Ratio | 1.48 | 1.12 | 1.13 | 1.07 | 1.15 | 2.93 | 2.01 | 2.05 | 1.52 | 1.50 | 1.07 | 1.92 | 1.81 | 2.12 | 1.37 | 1.62 | 1.30 |
| Polarization Efficiency (%) | 31.5 | 8.9 | 11.0 | 3.6 | 7.8 | 69.6 | 44.7 | 44.3 | 51.9 | 22.5 | 8.5 | 48.3 | 41.9 | 63.0 | 25.7 | 30.5 | 14.7 |

| Glass No. (Table I) | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Light Source Combination (Table II) | A | A | A | A | C | G | H | C | B | C | C | D | F | G | G |
| $T_o$ | 89.0 | 98.0 | 85.0 | 76.0 | 76.0 | 80.0 | 85.0 | 87.8 | 79.6 | 76.9 | 88.0 | 60.0 | 82.0 | 74.8 | 77.6 |
| $T_{Dl}$ | 25.0 | 21.1 | 30.2 | 7.4 | 0.8 | 13.0 | 21.5 | 9.4 | 8 | 0.5 | 11.0 | 0.5 | 2.0 | 40.4 | 1.6 |
| $T_{D11}$ | 40.2 | 33.0 | 30 | 17.6 | 23.0 | 34.4 | 34.0 | 24.0 | 13.5 | 15.3 | 33.0 | 1.2 | 5.0 | 60.4 | 3.6 |
| Dichroic Ratio | 1.60 | 1.43 | 1.004 | 1.63 | 3.65 | 2.15 | 1.52 | 1.70 | 1.30 | 2.96 | 2.48 | 1.22 | 1.33 | 2.79 | 1.27 |
| Polarization Efficiency (%) | 23.3 | 22.0 | — | 40.8 | 93.3 | 45.2 | 23.1 | 43.7 | 25.6 | 93.7 | 55.0 | 41.0 | 42.0 | 19.8 | 38.5 |

| Glass No. (Table I) | 31 | 32 | 33 | 34 |
|---|---|---|---|---|
| Light Source Combination (Table II) | H | H | H | H |
| $T_o$ | 81.5 | 85.0 | 84.0 | 82.0 |
| $T_{Dl}$ | 6.4 | 4.0 | 4.5 | 6.2 |
| $T_{D11}$ | 24.3 | 11.1 | 21.3 | 22.4 |
| Dichroic Ratio | 2.13 | 1.51 | 2.18 | 2.0 |
| Polarization Efficiency % | 58 | 47 | 65 | 56 |

It is evident from the foregoing description that glass articles produced in accordance with the invention need not be phototropic and optically anisotropic throughout their entire volume, but instead may comprise only a surface layer or other selected volume portion exhibiting these properties. Also, selected portions of a glass article may be subjected to different optical treatments to provide a photochromic article exhibiting at least two and optionally several volume regions exhibiting different light-polarizing properties and/or different colors in the darkened state.

Several methods for the manufacture of glass articles wherein only a selected region of the glass exhibits photochromic properties are known. For example, U.S. Pat. No. 3,419,370 to Cramer et al. describes the manufacture of a glass article having a silver halide-containing photochromic surface layer such as exemplified by Glass No. 28 above.

Although the property of reversibly changing from an undarkened, optically isotropic state to an absorbing, dichroic, birefringent state is very important for some applications, it will be recognized that glasses which indefinitely retain optically-induced dichroism or birefringence are also quite valuable, particularly for uses relating to information storage. As is well known, some silver halide photochromic glasses exhibit very low thermal fade rates such that they will remain in the darkened state indefinitely in the absence of bleaching light. These glasses are commonly termed bistable photochromic glasses, since both the faded and darkened states are readily retained by the glass. The treatment of a bistable photochromic glass to provide a stable dichroic, birefringent product comprises a further important aspect of the present invention, since it permits the storage of information relating to the direction of polarization as well as the intensity of a bleaching light source.

We claim:

1. A silver halide-containing photochromic glass article exhibiting dichroism and birefringence in the darkened state, wherein the particles comprising the silver halide photochromic phase are randomly oriented.

2. A silver halide-containing photochromic glass article capable of reversibly changing from a clear, optically-isotropic state to a darkened dichroic and birefringent state upon exposure to actinic radiation, said article being produced by irradiating a glass article containing a silver halide photochromic phase and having a finite thermal fade rate with linearly polarized bleaching light while said glass is in a darkened state.

3. A silver halide-containing photochromic glass article exhibiting a dark state color differing from the normal dark state color of the glass, said article being produced by irradiating a glass article containing a silver halide photochromic phase with colored optical bleaching light while the glass is in a darkened state.

4. A silver halide-containing photochromic glass article comprising at least two volume regions exhibiting differing light polarizing properties in the darkened state, said article being produced by irradiating at least one of said regions with linearly polarized optical bleaching light while said region is in a darkened state.

5. A silver halide-containing photochromic glass article comprising at least two volume regions exhibiting differing colors in the darkened state, said article being produced by irradiating at least one of said regions with colored optical bleaching light while said region is in a darkened state.

6. A process for producing a silver halide-containing photochromic glass article exhibiting dichroism and birefringence in the darkened state which comprises the step of irradiating a glass containing a silver halide photochromic phase with linearly polarized optical bleaching light while said glass is in a darkened state.

7. A process for producing a silver halide-containing photochromic glass article capable of reversibly changing from a clear optically-isotropic state to a darkened dichroic and birefringent state upon exposure to actinic radiation which comprises the step of irradiating a glass containing a silver halide photochromic phase and having a finite thermal fade rate with linearly polarized optical bleaching light for a time interval insufficient to fully bleach said glass while said glass is in a darkened state.

8. A process for producing a silver halide-containing photochromic glass article comprising at least two volume regions exhibiting different light polarizing properties in the darkened state which comprises the step of irradiating at least one of said regions with linearly polarized optical bleaching light while said region is in a darkened state.

9. A process for producing a silver halide-containing photochromic glass article comprising at least two volume regions exhibiting differing colors in the darkened state, said article being produced by irradiating at least one of said regions with colored optical bleaching light while said region is in a darkened state.

10. A process according to claim 7 which includes the further step of exposing the glass to actinic radiation to promote darkening during a time interval which at least partly coincides with the time interval of irradiating the glass with polarized optical bleaching light.

11. A process according to claim 10 wherein the intensity of the actinic radiation and/or the polarized optical bleaching light vary with time.

12. A process according to claim 10 wherein the time interval of exposure to actinic radiation extends beyond the completion of the time interval of irradiating the glass with polarized optical bleaching light.

13. A process according to claim 11 wherein the step of irradiating the glass with polarized optical bleaching light comprises a time interval in which the polarized optical bleaching light is gradually extinguished.

14. A process according to claim 11 wherein the step of exposing the glass to actinic radiation comprises a time interval in which the actinic radiation is gradually intensified.

15. A process according to claim 14 wherein the time interval in which the actinic radiation is gradually intensified precedes the time interval in which the polarized optical bleaching light is gradually extinguished.

* * * * *

UNITED STATES PATENT AND TRADEMARK OFFICE
CERTIFICATE OF CORRECTION

PATENT NO. : 4,125,404   Page 1 of 2

DATED : November 11, 1978

INVENTOR(S) : Roger J. Araujo, Nicholas F. Borrelli, Jan B. Chodak,
George B. Hares, Gerald S. Meiling, and Thomas P. Seward, III It is certified that error appears in the above-identified patent and that said Letters Patent are hereby corrected as shown below:

Column 3, line 38, "$T_{D1}$" should be -- $T_{DL}$ --.

Column 3, line 50, "$D_{D1}$" should be -- $T_{DL}$ --.

Column 7, line 14, "irradiations" should be -- irradiation --.

Column 7, line 48, "$(T_{D1})$." should be -- $(T_{DL})$. --.

Column 8, line 1, "with" should be -- which --.

Column 8, line 53, "$(T_1)$." should be -- $(T_L)$. --.

Column 8, line 55, "trolled-duratin" should be -- trolled-duration --.

Column 9, line 2, "$(T_{D1})$." should be -- $(T_{DL})$. --.

Column 9, line 33, after "heat" insert -- treating --.

Column 9, line 67, "darkened" should be -- undarkened --.

Column 10, lines 36-38, in the formula, "$T_{D1}$", both occurrences, should be -- $T_{DL}$ --.

UNITED STATES PATENT AND TRADEMARK OFFICE
CERTIFICATE OF CORRECTION

PATENT NO. : 4,125,404

DATED : November 11, 1978

INVENTOR(S) : Roger J. Araujo, Nicholas F. Borrelli, Jan B. Chodak, George B. Hares, Gerald S. Meiling and Thomas P. Seward, III It is certified that error appears in the above-identified patent and that said Letters Patent are hereby corrected as shown below:

Column 10, line 42, "$T_{D1}$" should be -- $T_{DL}$ --.

Column 10, lines 55-58, in the formula, "$T_{D1}$" should be -- $T_{DL}$ --.

Column 10, line 67, "specified" should be -- specific --.

Columns 13 and 14, Table I-continued, component "A" on line 2 and "$_2O_3$" on line 3 should be -- $Al_2O_3$ --.

Columns 13 and 14, Table I-continued, Annealing Temp. for Example 29 should be -- 650°C --; for Example 30 should be -- 650°C --; and delete "C   650°C" in the following line.

Columns 15 and 16, Table III, "$T_{D1}$" in each occurrence should be -- $T_{DL}$ --.

Column 15, line 63, "($T_{D1}$)." should be -- ($T_{DL}$). --.

Signed and Sealed this

Third Day of July 1979

[SEAL]

Attest:

Attesting Officer

LUTRELLE F. PARKER
*Acting Commissioner of Patents and Trademarks*